United States Patent [19]

Ryoke et al.

[11] Patent Number: 4,552,798
[45] Date of Patent: Nov. 12, 1985

[54] MAGNETIC RECORDING MEDIUM

[75] Inventors: Katsumi Ryoke; Yasuhiro Abe; Shinobu Iida; Eiichi Tadokoro, all of Kanagawa, Japan

[73] Assignee: Fuji Photo Film Co., Ltd., Kanagawa, Japan

[21] Appl. No.: 577,919

[22] Filed: Feb. 7, 1984

[30] Foreign Application Priority Data

Feb. 7, 1983 [JP] Japan ................................. 58-18584

[51] Int. Cl.[4] .............................................. G11B 5/72
[52] U.S. Cl. ..................................... 428/194; 360/134; 427/128; 427/131; 428/219; 428/340; 428/694; 428/695; 428/900
[58] Field of Search ............... 428/694, 695, 202, 192, 428/194, 219, 340, 900; 427/130, 44, 128, 131; 360/134–136

[56] References Cited

U.S. PATENT DOCUMENTS

| 3,041,196 | 6/1982 | Stella | 428/192 |
|---|---|---|---|
| 3,042,639 | 7/1962 | Adams . | |
| 3,387,993 | 6/1968 | Flowers . | |
| 3,470,021 | 9/1969 | Hendricx . | |
| 3,476,596 | 11/1969 | Carroll | 428/695 |
| 3,625,760 | 12/1971 | Slovinsky | 117/235 |
| 3,634,253 | 1/1972 | Akashi . | |
| 3,833,412 | 9/1974 | Akashi | 117/240 |
| 4,135,031 | 1/1979 | Akashi | 428/694 |
| 4,322,474 | 3/1982 | Matsuura | 428/694 |
| 4,361,621 | 11/1982 | Isobe | 428/329 |
| 4,407,853 | 4/1982 | Okita | 427/44 |

Primary Examiner—Ellis P. Robinson
Attorney, Agent, or Firm—Sughrue, Mion, Zinn, Macpeak & Seas

[57] ABSTRACT

A magnetic recording medium comprised of a support base having a magnetic recording layer positioned thereon is disclosed. The recording medium has positioned an aliphatic acid ester compound on an edge portion of the surface of the recording layer. By utilizing the aliphatic acid ester the recording medium has less audio output variation and the tracking control of the medium is improved. Further, the medium has good running characteristics and excellent sensitivity.

15 Claims, 1 Drawing Figure

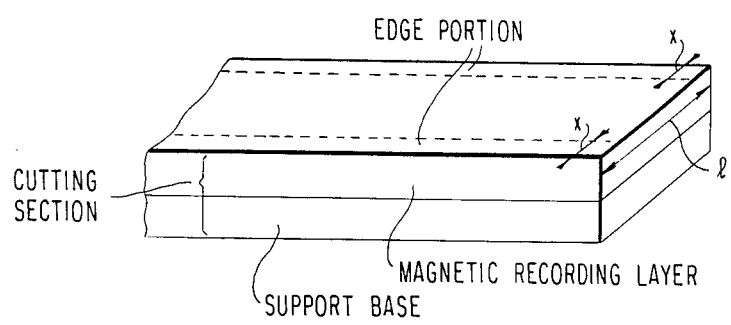

MAGNETIC RECORDING MEDIUM

FIELD OF THE INVENTION

The present invention relates to a magnetic recording medium and, more specifically, to a magnetic recording medium in which friction characteristics of the magnetic layer are controlled so that it brings about less audio output variation or which does not readily generate inferior control tracking.

BACKGROUND OF THE INVENTION

In recent years, magnetic recording/reproducing machines have been widely used. Accordingly, inferior adjustment of the magnetic recording medium running system often takes place with magnetic recording/reproducing machines.

When the axes of a magnetic recording/reproducing machine, which are placed on the running passage for the magnetic recording medium, (such as a feed reel axis, a tension stabilizer guide axis, a revolving head cylinder axis, a pinch roller axis, a capstan axis, a running guide axis or a winding reel axis, etc.) cause a minute warp at the normal axis position, the magnetic recording medium suffers minute damage. This damage can increase the audio output variation, if the magnetic recording medium is allowed to run in such a magnetic recording/reproducing machine. Further, damage is formed in control tracking for controlling rotation of the video head (namely, the control tracking is damaged so that the servomechanism does not operate normally which causes jitter and time bace errors, etc. This minute damage in the magnetic recording medium generally causes audio output variation and inferior tracking control over the passage of time. As a result, creases like seaweed and formed on the edges and end parts in the width direction of the magnetic recording medium.

Hitherto, the audio output variation and/or the inferior tracking control was improved by reducing the friction coefficient of the magnetic recording medium, namely, by improving the surface lubricating property, as described in Japanese Patent Application (OPI) Nos. 154,632/82, 119,930/81, 124,122/81 and 124,126/81. In order to improve the surface lubricating property, a desired lubricant was uniformly blended and/or dispersed in a coating solution and applied to a polyester base. Alternatively, the lubricant was dissolved in a solvent and applied as an overcoating layer to the surface of the polyester base to which the coating solution had been applied and/or the back thereof.

As the lubricant, aliphatic acids and/or aliphatic acid esters having a melting point of 100° C. or less, etc. were used. However, it was difficult to obtain magnetic recording media having sufficient characteristics, even though these additives were used. Furthermore, when these additives were used in a large amount in order to increase the lubricating effect, mechanical strength of the recording layer sometimes deteriorated.

Thus, as a result of analyzing in order to improve the audio output variation and/or the inferior tracking control of the magnetic recording medium, the present inventors have found that it could be attained by improving ununiform running tension in the width direction of the magnetic recording medium and by controlling the friction characteristics of the edges and cut faces of the magnetic recording medium. These facts indicate that the audio outputvariation and the inferior tracking control can not be improved, even if the surface lubricating property of the magnetic recording medium is improved.

Namely, in studying the magnetic recording/reproducing machine in detail, it is understood that the surface and the cutting section of the magnetic layer in the magnetic recording medium pass in contact with various kinds of material. Further, it is very difficult to give a good lubricating property for all materials with respect to the surface of the magnetic layer using the same lubricant, though it is applied to the same surface of the magnetic layer. Namely, the magnetic face of the magnetic recording medium generally runs in contact with an audio head and a control head in the edge portions thereof and with a video head in the central part thereof. Further, in the other places, the magnetic face runs in contact with a stainless steel guide pole or a chromium plating guide pole. Namely, in order to give a satisfactory lubricating property for such materials to the magnetic recording medium, it is possible to properly use a lubricant suitable for materials contacting with the surface of said magnetic layer. The present inventors have now found that the lubricating property suitable for contacting materials can be obtained by applying, for example, an aliphatic acid ester compound to both edge portions or one edge portion of the surface of the magnetic layer in the magnetic recording medium and using aliphatic acids, silicone or phosphoric acid esters, etc. to give a lubricating property to the central part.

SUMMARY OF THE INVENTION

An object of the present invention is to provide a magnetic recording medium having less audio output variation.

Another object is to provide a magnetic recording medium in which the inferior tracking control is improved.

Yet another object of the present invention is to provide a magnetic recording medium having good running characteristics.

Still another object is to provide a magnetic recording medium having good sensitivity.

Another object is to provide a novel method of adding a lubricant to the magnetic recording medium.

The objects of the present invention are attained by providing a magnetic recording medium which is characterized in that an aliphatic acid ester compound is present in at least one edge portion on the surface of the magnetic layer in the magnetic recording medium.

BRIEF DESCRIPTION OF THE DRAWING

The FIGURE shows the edge portion wherein the aliphatic acid ester compound is present.

DETAILED DESCRIPTION OF THE INVENTION

As used herein, the term "edge portion" designates areas on the exposed surface of the magnetic layer extending inwardly from the lateral edges of the magnetic layer, as shown in the FIGURE. The ratio of the width of the edge portion (x) to the width of the magnetic layer (l) is preferably not more than 3/20.

The aliphatic acid ester compounds used in the present invention are obtained by esterifying on aliphatic alcohol with an aliphatic acid. Useful aliphatic alcohols include monohydric aliphatic alcohols, dihydric aliphatic alcohols, trihydric aliphatic alcohols, tetrahydric aliphatic alcohols and hexahydric aliphatic alcohols, etc. which have 1 to 20 carbon atoms, and preferably aliphatic alcohols having 1 to 12 carbon atoms. Useful aliphatic acids include organic acids having 1 to 22 carbon atoms, preferably 10 to 18 carbon atoms.

Preferred examples of aliphatic acid esters used in the present invention include the following.
A-1 Methyl stearate (m.p. 39° C.)
A-2 12-Oxystearic acid laurate (m.p. 25°–30° C.)
A-3 Stearic acid monoglyceride (m.p. 64°–72° C.)
A-4 Palmitic acid diglyceride (m.p. 53°–67° C.)
A-5 Anhydrosorbitan monolaurate (liquid at room temp.)
A-6 Anhydrosorbitan monostearate (m.p. 47°–53° C.)
A-7 Anhydrosorbitan tristearate (m.p. 48°–58° C.)
A-8 Pentaerythritol distearate (m.p. 50°–53° C.)
A-9 Pentaerythritol tristearate (m.p. 43°–53° C.)
A-10 Capric acid triglyceride (m.p. 28°–30° C.)
A-11 Anhydrosorbitan tetrastearate (m.p. 52°–57° C.)
Of these, aliphatic acid esters A-6 to A-11 are particularly preferred.

Further, preferred examples of aliphatic acid ester compounds used in the present invention which are available in the market include the following.
B-1 Span 20 (sorbitan monolaurate: produced by Kao Atlas Co.)
B-2 Span 40 (sorbitan monopalmitate: produced by Kao Atlas Co.)
B-3 Span 60 (sorbitan monostearate: produced by Kao Atlas Co.)
B-4 Span 65 (sorbitan tristearate: produced by Kao Atlas Co.)
B-5 Span 80 (sorbitan monoolate: produced by Kao Atlas Co.)
B-6 Span 85 (sorbitan trioleate: produced by Kao Atlas Co.)

The aliphatic acid ester compounds used in the present invention are not restricted to the above described compounds. They may be substituted with various groups (e.g., an alkyl, alkenyl, oxyalkyl or polyoxyethylene group having 1 to 12 carbon atoms) and their degree of esterification may vary.

These aliphatic acid ester compounds are applied to the edge portions of the magnetic recording medium as they are or as a state of being diluted with a solvent by means of a brush, nonwoven cloth, cotton cloth, urethane foam or foamed styrene resin, etc. Alternatively, the aliphatic acid ester compounds may be applied, by the same means as above, to the cutting section of the magnetic recording medium thereby to exude onto the edge portions. Further, they may be attached to the cutting section by means of spraying, etc.

The aliphatic acid ester compounds used in the present invention are preferred to have a viscosity of 1 to 1000 cp (25° C.). However, even if they have a viscosity higher than the above described range, they can be practically used, if the viscosity of them is reduced to 1000 cp or less by diluting with a suitable solvent. Any solvents can be used for the purpose as long as they do not damage the support base. Examples of solvent include acetic acid esters (e.g., methyl acetate and butyl acetate), ketones (e.g., methyl ethyl ketone and acetone), alkanes (e.g., n-hexane), alcohols (e.g., methanol and ethanol) and aromatic compounds.

To a high polymer base, a magnetic solution is applied or a magnetic solution and a backing solution are applied. After having carried out orientation and drying, an operation for making a mirror face and/or an operation for hardening is carried out, and the coated base is cut into a desired width. The cutting width can be suitably selected from, for example, 2 inches, 1 inch, ¾ inch, ½ inch, ¼ inch and 8 mm, etc.

The coating amount of the aliphatic acid ester compounds is generally provided on the edge portion(s) of the surface of the magnetic layer in an amount of 0.2 to 1000 mg/m$^2$, preferably 0.4 to 500 mg/m$^2$ and more preferably 2 to 100 mg/m$^2$.

In the case that the aliphatic acid ester compounds are applied to the cutting section of the magnetic recording medium, the coating amount of the compounds can be suitably selected from a range of 0.01 to 500 g/m$^2$ based on the cutting section according to cutting width, thickness of the high polymer base (e.g., 6–50 μm) of the magnetic recording medium, thickness of the undercoating layer, thickness of the magnetic layer (e.g., 1 to 10 μm), thickness of the undercoating layer of the backing layer, and thickness of the backing layer (e.g., 0.5 to 3 μm). More preferably, the coating amount is in a range of 0.01 to 100 g/m$^2$. In general, the coating amount may be small when the base and magnetic layer are thin and the aliphatic acid ester has high exudation property. If the amount of the aliphatic acid ester compounds is too large, the above described effect is difficult to obtain, because they uniformly exude onto the entire surface of the magnetic layer. While the degree of exudation depends upon the molecular weight and melting point of the aliphatic acid ester compounds and the coating amount, but it is not preferred to exceed a coating amount of 500 g/m$^2$. Further, the aliphatic acid ester compounds preferably have a melting point of 150° C. or less, more preferably 20° to 100° C.

Apart from the purpose of the present invention, it is also possible to uniformly add an aliphatic acid ester in the magnetic layer, as described in Japanese Patent Application (OPI) Nos. 53,402/74, 92,101/75, and 10,603/75 and Japanese Patent Publication Nos. 28367/64, 18064/66, 6427/67, 15007/73, 15624/72, 18063/66, and 12950/72. Typical examples of the aliphatic acid ester are those having a melting point of 30° C. or less and represented by the following formula:

$$C_nH_{2n+1}COOC_mH_{2m+1}$$

wherein n is an integer of 9 to 17 and m is an integer of 1 to 8, including hexyl laurate (m.p. −4° C.), ethyl myristate (m.p. 12.3° C.), ethyl palmitate (m.p. 25° C.), butyl palmitate (m.p. 18° C.), butyl stearate (m.p. 27° C.), pentyl stearate (m.p. <15° C.) and butyl myristate (m.p. 3° C.). The aliphatic acid ester is generally added in an amount of 0.1 to 3 g per 100 g of ferromagnetic powder.

In the present invention, conventional ferromagnetic powders, additives and bases (which may have an undercoating layer or a backing layer) and a convention method of making a magnetic recording medium can be used as described in, for example, Japanese Patent Publication No. 26890/81 and U.S. Pat. No. 4,135,016.

In the following, the present invention is illustrated in greater detail with reference to examples. However, the scope of the invention is not limited to the examples. In the examples, "part" means "part by weight".

EXAMPLE 1

After the following composition was sufficiently kneaded in a ball mill, 35 parts of a polyisocyanate compound (trade name "Desmodur L-75" produced by Bayer Co.) was added thereto and uniformly dispersed therein to prepare a magnetic coating.

| | |
|---|---|
| γ-Fe$_2$O$_3$ powder | 300 parts |
| Vinyl chloride-vinyl acetate copolymer (Polymerization ration 87:13, degree of polymerization: about 400) | 30 parts |
| Epoxy resin (epoxy group content 0.56) | 30 parts |
| Carbon black (average particle size 80 mμ) | 5 parts |
| Ethyl acetate | 250 parts |
| Cyclohexanone | 250 parts |

The resulting magnetic coating was applied to a surface of a polyester base film and dried to obtain a magnetic tape.

After the resulting tape was subjected to an operation of making a mirror face, it was cut to a 1 inch width to obtain two samples. One of the resulting samples was called Sample 1. To both cutting sections of the other sample, a 10 wt% solution of Compound A-3 in ethyl acetate was applied in an amount of 30 g/m$^2$ (Compound A-3) to prepare Sample 2.

COMPARATIVE EXAMPLE 1

The following composition wherein Compound A-3 was added to the composition in Example 1 was placed in a ball mill. After sufficiently being kneaded, 35 parts of "Desmodur L-75" was added thereto and uniformly dispersed to obtain a magnetic coating.

| | |
|---|---|
| γ-Fe$_2$O$_3$ powder | 300 parts |
| Vinyl chloride-vinyl acetate copolymer (copolymerization ratio 87:13, degree of polymerization about 400) | 30 parts |
| Epoxy resin (epoxy group content 0.56) | 30 parts |
| Carbon black (average particle size 80 mμ) | 5 parts |
| Ethyl acetate | 250 parts |
| Cyclohexanone | 250 parts |
| Compound A-3 | 6 parts |

After being subjected to an operation for making a mirror face by the same manner as in Example 1, the sample was cut to a 1 inch width to obtain Sample 3.

External appearance of rolled state and running load of Samples 1–3 were measured in the following manner, and the results are shown in Table 1.

The external appearance of the rolled state was examined as follows. Namely, a guide role axis in the magnetic recording/reproducing machine was inclined to the normal axis position at 15° so as to make the tape tension ununiform. After the running of the sample was repeated 300 times, the sample was preserved in a room at 30° C. and 45% RH for 2 weeks. The sample was then wound up again by the magnetic recording/reproducing machine, and the external appearance of the rolled state was evaluated in terms of irregularity (mm) of the tape edge in the rolled plane. When the irregularity was less than 0.3 mm, the sample was given the symbol A; when it was from 0.3 to 0.5 mm, the sample was given the symbol B; and when it was more than 0.5 mm, the sample was given the symbol C.

The running load was measured by a tension pole as a weight added by the tape during running thereof.

TABLE 1

| Sample | External appearance of rolled state | Running load (g) |
|---|---|---|
| 1 | C | 345 |

TABLE 1-continued

| Sample | External appearance of rolled state | Running load (g) |
|---|---|---|
| 2 | A | 280 |
| 3 | B | 315 |

The results show that Sample 2 is particularly excellent in external appearance of the rolled state and running load, as compared to Samples 1 and 3 (comparative samples).

EXAMPLE 2

After the following composition was sufficiently kneaded in a ball mill, 40 parts of "Desmodur L-75" was added thereto and uniformly dispersed to prepare a magnetic coating.

| | |
|---|---|
| γ-Fe$_2$O$_3$ powder | 300 parts |
| Vinyl chloride-vinyl acetate-maleic acid-vinyl alcohol copolymer | 40 parts |
| Epoxy resin | 25 parts |
| Carbon black (average particle size 23 mμ) | 10 parts |
| Nitrocellulose | 10 parts |
| Lecithin | 5 parts |
| Oleic acid | 5 parts |
| Ethyl acetate | 400 parts |
| Cyclohexanone | 200 parts |
| Compound B-4 | shown in Table 2 |

This magnetic coating was applied to a surface of a polyester base film and dried to prepare a magnetic tape.

After an operation for making a mirror face was carried out by the same manner as in Example 1, it was cut to a 1 inch width to prepare Samples 4, 5 and 6.

Further, two magnetic tapes were prepared in the same manner as in the preparation of Sample 6. Then, the two magnetic tapes were coated on the both cutting sections with Compound B-4 in amounts of 7 g/m$^2$ and 70 g/m$^2$ (for one cutting section), respectively, to prepare Samples 7 and 8.

The external appearance of rolled state and running load of each sample were measured in the same manner as described above. Further, reproduction RF output was measured as follows. Using the machine wherein the video head height was adjusted to 60μ while observing with a microscope, running of a sample tape was repeatedly carried out under a normal state and the time required for the reproduction RF output to be reduced 1 dB was recorded by a recorder.

The results are shown in Table 2.

TABLE 2

| Sample | Amount added or coated | | External appearance of rolled State | Running load (g) | Reproduction RF output |
|---|---|---|---|---|---|
| 4 | 15 | parts | B | 310 | Within 2 hours |
| 5 | 3 | parts | B | 310 | Within 2 hours |
| 6 | 0 | part | C | 320 | Within 1 hour |
| 7 | 7 | g/m$^2$ | A | 300 | More than 3 hours |
| 8 | 70 | g/m$^2$ | A | 300 | More than 3 hours |

As is obvious from this example, the load on the video head is great in Samples 4, 5 and 6 (comparative samples), because the running load is high. Further, it is understood from the time required for the reproduction RF output to be reduced 1 dB that Samples 7 and 8 are particularly excellent.

EXAMPLE 3

After the following composition was sufficiently kneaded in a ball mill, 25 parts of "Desmodur L-75" was added and uniformly dispersed to prepare a magnetic coating.

| | |
|---|---|
| γ-Fe₂O₃ powder | 300 parts |
| Nitrocellulose | 30 parts |
| Polyurethane (molecular weight: about 30,000) | 20 parts |
| Vinyl chloride-vinyl acetate-vinyl alcohol polymer | 10 parts |
| Carbon black (average particle size 40 mμ) | 8 parts |
| Butyl palmitate | 5 parts |
| Abrasive (Cr₂O₃) | 20 parts |
| Myristic acid | 2 parts |
| Cyclohexanone | 300 parts |
| Methyl ethyl ketone | 150 parts |
| Toluene | 100 parts |
| Compound A-2 | shown in Table 3 |

This magnetic coating was applied to a surface of a polyester base film and dried to obtain a magnetic tape.

After an operation for making a mirror face by the same manner as in Example 1, it was cut to a ½ inch width to prepare Samples 9, 10 and 11.

Further, two magnetic tapes were prepared in the same manner as in the preparation of Sample 11. Then, the two magnetic tapes were coated on the both cutting sections with Compound A-2 in amounts of 10 g/m² and 50 g/m² (for one cutting section), respectively, to prepare Samples 12 and 13.

The running load of each sample was measured in the same manner as above. Further, the audio output variation was examined as follows. Namely, a guide pole axis in the magnetic recording/reproducing machine was inclined to the normal axis position at 15°. After the running of the sample was repeated 300 times in this machine, a sine wave signal of 1 KHz was recorded on the sample over the whole length thereof at a standard input level with a prescribed bias, and a reproduction output level thereof was recorded by a recorder. The maximum value of the output variation was read from the recorded paper and it was indicated as dB. Namely, the larger the value of the audio output variation is, the greater the variation is, which is not desirable. The nearer 0 db the value is, the smaller the output variation in reproducing is, which is desirable.

TABLE 3

| Sample | Amount added or coated | Audio output variation | Running load (g) |
|---|---|---|---|
| 9 | 15 parts | 1.0 dB | 130 |
| 10 | 5 parts | 0.8 dB | 135 |
| 11 | 0 part | 2.9 dB | 155 |
| 12 | 10 g/m² | 0.1 dB | 110 |
| 13 | 50 g/m² | 0.1 dB | 115 |

It is understood from this example that the presence of the aliphatic acid ester on the edge portion is effective for, particularly, audio output variation and running load.

EXAMPLE 4

After the following composition was sufficiently kneaded in a ball mill, 25 parts of "Desmodur L-75" was added thereto and uniformly dispersed therein to obtain a magnetic coating.

| | |
|---|---|
| γ-Fe₂O₃ powder | 300 parts |
| Nitrocellulose | 30 parts |
| Polyurethane (molecular weight: about 30,000) | 20 parts |
| Vinyl chloride-vinyl acetate-vinyl alcohol copolymer | 10 parts |
| Carbon black (average particle size 115 mμ) | 8 parts |
| Butyl palmitate | 5 parts |
| Abrasive (Al₂O₃) | 20 parts |
| Myristic acid | 2 parts |
| Cyclohexanone | 300 parts |
| Methyl ethyl ketone | 150 parts |
| Toluene | 100 parts |
| Compound A-10 | shown in Table 4 |

This magnetic coating was applied to a surface of a polyester base and dried to produce a magnetic tape. After being subjected to an operation for making a mirror face by the same manner as in Example 1, it was cut into ½ inch width to prepare Samples 14, 15 and 16.

Further, two magnetic tapes were prepared in the same manner as in the preparation of Sample 16. Then, the two magnetic tapes were coated on the both cutting sections with Compound A-10 in amounts of 10 g/m² and 50 g/m² (for one cutting section), respectively, to prepare Samples 17 and 18.

The audio output variation and running load of each sample were measured in the same manner as described, and the results are shown in Table 4.

TABLE 4

| Sample | Amount added or coated | Audio output variation | Running load (g) |
|---|---|---|---|
| 14 | 15 parts | 0.8 dB | 130 |
| 15 | 5 parts | 0.7 dB | 130 |
| 16 | 0 part | 2.5 dB | 140 |
| 17 | 10 g/m² | 0.2 dB | 100 |
| 18 | 50 g/m² | 0.1 dB | 105 |

It is understood from this example that the presence of the aliphatic acid ester on the edge portion is effective for, particularly, audio output variation and running load.

EXAMPLE 5

After the following composition was sufficiently kneaded in a ball mill under an argon stream, 30 parts of "Desmodur L-75" was added thereto and uniformly dispersed therein to obtain a magnetic coating.

| | |
|---|---|
| Co—Ni—Fe alloy powder (specific Surface area 50 m²/g) | 300 parts |
| Nitrocellulose | 50 parts |
| Polyurethane (molecular weight about 30,000) | 20 parts |
| Benzimidazole | 1 part |
| Abrasive (Cr₂O₃) | 20 parts |
| Isooctyl stearate | 10 parts |
| Carbon black | 8 parts |
| Methyl ethyl ketone | 300 parts |
| Ethyl acetate | 150 parts |
| Toluene | 150 parts |
| Compound A-5 | shown in Table 5 |

This magnetic coating was applied to a surface of a polyester base and dried to produce a magnetic tape. After being subjected to an operation for making a mirror face by the same manner as in Example 1, it was cut into 1/20 inch width to prepare Samples 19 and 20.

Further, two magnetic tapes were prepared in the same manner as in the preparation of Sample 20. The two magnetic tapes were coated on the both cutting sections with Compound A-5 in amounts of 10 g/m² and 50 g/m² (for each cutting section), respectively, to prepare Samples 21 and 22.

The running load and the audio output variation of each sample were measured in the same manner as described above, except using a VHS deck available in the market, wherein the video head and the audio head in the video deck were changed with those for a high coercive force and the running system was not changed other than the above described measurement of running load and the change of the guide pole axis.

The results are shown in Table 5.

TABLE 5

| Sample | Amount added or coated | Audio output variation | Running load (g) |
| --- | --- | --- | --- |
| 19 | 10 parts | 2.1 dB | 153 |
| 20 | 0 part | 4.2 dB | 186 |
| 21 | (10 g/m²) | 0.2 dB | 115 |
| 22 | (50 g/m²) | 0.2 dB | 115 |

It is understood from this example that the presence of the aliphatic acid ester in the edge is effective for, particularly, reduction of audio output variation and reduction of running load.

While the invention has been described in detail and with reference to specific embodiments thereof, it will be apparent to one skilled in the art that various changes and modifications can be made therein without departing from the spirit and scope thereof.

What is claimed is:

1. A magentic recording medium, comprising:
   a support base having thereon
   a magnetic recording layer comprised of a ferromagnetic powder dispersed in a binder; and
   an aliphatic acid ester compound being present only on an edge portion or the edge portion and a cutting section of the surface of the magnetic recording layer.

2. A magnetic recording medium as claimed in claim 1, wherein the aliphatic acid ester is obtained by esterifying aliphatic alcohol with aliphatic acid.

3. A magnetic recording medium as claimed in claim 2, wherein the aliphatic alcohol is selected from the group of aliphatic alcohols containing 1 to 20 carbon atoms and the aliphatic acid is selected from the group of aliphatic acids containing 1 to 22 carbon atoms.

4. A magnetic recording medium as claimed in claim 3, wherein the aliphatic alcohol contains 1 to 12 carbon atoms and the aliphatic acid contains 10 to 18 carbon atoms.

5. A magnetic recording medium as claimed in claim 1, wherein the aliphatic acid ester is applied to a cutting section of the recording medium in an amount in the range of 0.01 to 500 g/m².

6. A magnetic recording medium as claimed in claim 5, wherein the aliphatic acid ester is applied to the cutting section of the recording medium in an amount in the range of from 0.01 to 100 g/m².

7. A magnetic recording medium as claimed in claim 6, wherein the aliphatic acid ester has a melting point of 150° C. or less.

8. A magnetic recording medium as claimed in claim 7, wherein the aliphatic acid ester has a melting point of 20° to 100° C.

9. A magnetic recording medium as claimed in claim 1, wherein the aliphatic acid ester is present on the edge portion in an amount of 0.2 to 1000 mg/m².

10. A magnetic recording medium as claimed in claim 1, wherein the aliphatic ester compound is selected from the group consisting of methyl stearate, 12-oxystearic acid laurate, stearic acid monoglyceride, palmitic acid diglyceride, anhydrosorbitan monolaurate, anhydrosorbitan monostearate, anhydrosorbitan tristearate, pentaerythritol distearate, pentaerythritiol tristearate, capric acid triglyceride, anhydrosorbitan tetrastearate, sorbitan monolaurate, sorbitan monopalmitate, sorbitan monostearate, sorbitan tristearate, sorbitan monoolate and sorbitan trioleate.

11. A magnetic recording medium as claimed in claim 10, wherein the aliphatic ester compound is selected from the group consisting of anhydrosorbitan monostearate, anhydrosorbitan tristearate, pentaerythritol distearate, pentaerythritol tristearate, capric acid triglyceride and anhydrosorbitan tetrastearate.

12. A magnetic recording medium as claimed in claim 9, wherein the amount is in the range of 0.4 to 500 mg/m².

13. A magnetic recording medium as claimed in claim 12, wherein the amount is in the range of 2 to 100 mg/m².

14. A magnetic recording medium as claimed in claim 1, wherein the edge portion designates an area on the exposed surface of the magnetic layer extending inwardly from the lateral edge of the magnetic layer where the ratio of the width of the edge portion to the width of the magnetic layer is not more than 3/20.

15. A magnetic recording medium as claimed in claim 1, wherein the magnetic recording medium is a video tape.

* * * * *